F. A. GAHRING.
TIRE CHAIN.
APPLICATION FILED JAN. 6, 1917.
1,282,804.
Patented Oct. 29, 1918.
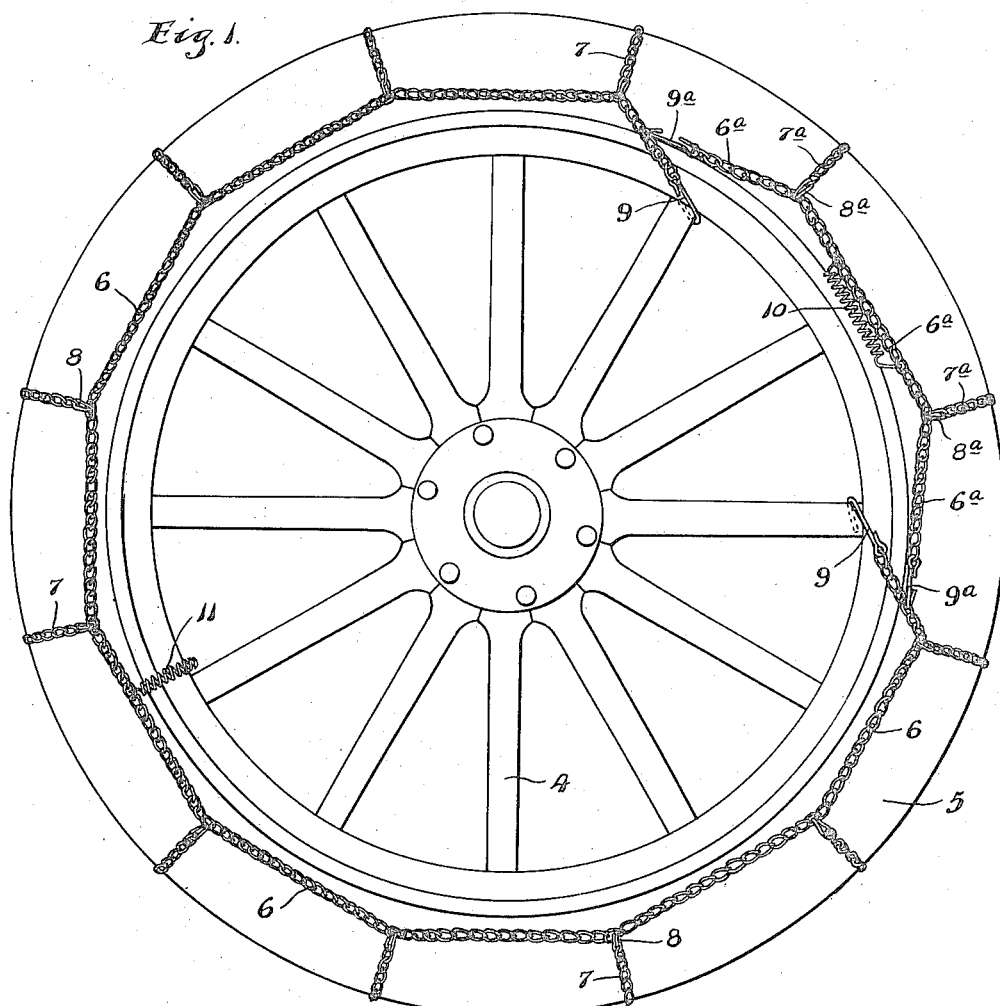
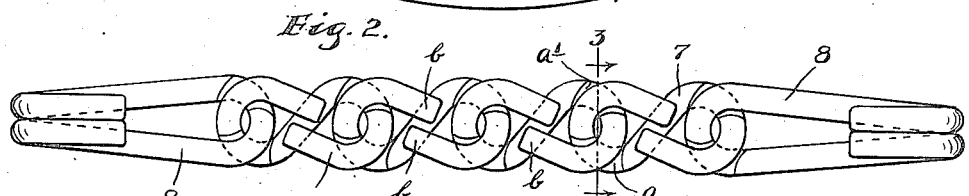
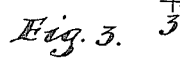
WITNESSES.
H. L. Opsahl.
E. C. Wells
INVENTOR.
F. A. Gahring.
BY HIS ATTORNEYS.
Williamson Merchant

UNITED STATES PATENT OFFICE.

FREDERICK A. GAHRING, OF MINNEAPOLIS, MINNESOTA, ASSIGNOR TO PEERLESS CHAIN COMPANY, OF WINONA, MINNESOTA, A CORPORATION.

TIRE-CHAIN.

1,282,804.  Specification of Letters Patent.  Patented Oct. 29, 1918.

Application filed January 6, 1917. Serial No. 140,869.

*To all whom it may concern:*

Be it known that I, FREDERICK A. GAHRING, a citizen of the United States, residing at Minneapolis, in the county of Hennepin and State of Minnesota, have invented certain new and useful Improvements in Tire-Chains; and I do hereby declare the following to be a full, clear, and exact description of the invention, such as will enable others skilled in the art to which it appertains to make and use the same.

My present invention has for its object to provide an improved non-skid tire chain and to such ends, generally stated, the invention consists of novel devices and combinations of devices hereinafter described and defined in the claims.

In the accompanying drawings which illustrate the invention like characters indicate like parts throughout the several views.

Referring to the drawings:

Figure 1 is a side elevation, showing the chain applied to an ordinary automobile wheel equipped with a pneumatic tire;

Fig. 2 is a plan view, showing one of the transverse tread chains, looking at the tire engaging face thereof; and Fig. 3 is a section on the line 3—3 of Fig. 2.

The wheel is indicated as an entirety by the numeral 4 and the pneumatic tire thereof by the numeral 5. The non-skid tire chain comprises laterally spaced flexible side chains 6 and $6^a$, and transverse tread chains 7 and $7^a$. The transverse tread chains 7 at their ends are provided with hook-like links 8 that are hooked into the links of the side chain 6; and in like manner the transverse tread chains $7^a$ at their ends are provided with hook-like links $8^a$ that are hooked into links of the side chains $6^a$.

The side chains 6 extend more than half way around the wheel and at their ends are provided with anchoring hooks 9 adapted to be engaged over certain of the spokes of the wheel 4 as shown in Fig. 1.

The side chains $6^a$ are supplemental to the main side chains 6, and at their ends they are provided with anchoring hooks $9^a$, adapted to be hooked into intermediate links of the end portions of the main side chains 6. When the side chains 6 and $6^a$ are anchored to the wheel and connected together as just described there will be some slack or play therein and to take this up I provide the intermediate portions of the supplemental chains $6^a$ with coiled springs 10 anchored thereto at their ends. These springs 10 will shorten the intermediate portions of the said chains $6^a$ and cause the same to buckle the end portions of the main side chains 6 and thus take up the slack therein.

The intermediate portions of the two main side chains 6 are connected to the ends of the coiled spring 11 which is placed between spokes and over the rim of the wheel 4. This spring 11 assists in holding the chain against outward movements on the wheel, on account of centrifugal force at high speed of the wheel.

An important and novel feature of this invention is found in the construction of the links of the transverse tread chains 7 and $7^a$. See particularly Figs. 2 and 3 wherein it will be noted that the links of the said chains are of figure 8 form but with the ends $b$ of the link-forming element spaced apart from each other, but both welded or otherwise rigidly secured to the intermediate portions of said link-forming element. This construction not only gives a strong link but forms links which have a maximum amount of road engaging surface. For example, each link has two road engaging end surfaces $b$ instead of one bearing point or line as would be the case if the ends of the links were brought axially together. The double bearing, of course, greatly increases the wearing life of the links. At points $a$ and $a^1$ the links are preferably flattened slightly so that the said links, which are twisted slightly, will more flatly engage the road and the tire. This flattening also permits the use of heavier steel wire in the construction of the links than would otherwise be possible without giving the links such form that they would not have good bearing either against the tire or on the road. The tire-engaging surfaces of the links may also be slightly flattened, if desired, as shown in Fig. 3.

With the chain constructed in main and supplemental parts, as above described, it is possible to apply the chain without jacking up the wheel, or even while the wheel is in a rut where the machine cannot be moved forward or rearward, simply by first applying the main section and then rotating the wheel until the uncovered portion of the wheel is at the top or in position where the supplemental part of the chain may be added.

What I claim is:

1. A non-skid chain having interlocking links, the said links being formed with double loops and having the ends of the link forming elements offset from each other and rigidly attached to the intermediate body portions of the respective links at different points.

2. A non-skid chain having interlocking links, the said links being formed with double loops and having the ends of the link forming elements offset from each other and rigidly attached to the intermediate body portions of the respective links at different points, the said ends being exposed at the outer side of the chain for engagement with the roadbed.

3. A non-skid tire chain, comprising laterally spaced side chains and transverse tread chains cross-connected to the same, said tread chains having approximately figure 8 shaped links with the ends of the link-forming elements offset from each other and rigidly secured to the intermediate body portions of said links, and said offset ends being exposed at the outer side of the chain for engagement with the road.

4. A non-skid tire chain, comprising laterally spaced side chains and transverse tread chains cross-connected to the same, said tread chains having approximately figure 8 shaped links with the ends of the link-forming elements offset from each other and rigidly secured to the intermediate body portions of said links, and said offset ends being exposed at the outer side of the chain for engagement with the road, the road-engaging portions of said tread chains having flattened surfaces at points where they contact with the road-engaging portions of interconnected links.

In testimony whereof I affix my signature in presence of two witnesses.

FREDERICK A. GAHRING.

Witnesses:
CLARA DEMAREST,
M. E. BLODGETT.